(12) United States Patent
Choo (10) Patent No.: US 12,503,062 B2
(45) Date of Patent: Dec. 23, 2025

(54) SUCTION MOUNT FOR A HANDHELD ELECTRONIC DEVICE ACCESSORY

(71) Applicant: ANNEX PRODUCTS PTY. LTD., South Yarra (AU)

(72) Inventor: Melvin Choo, South Yarra (AU)

(73) Assignee: ANNEX PRODUCTS PTY. LTD., South Yarra (AU)

( * ) Notice: Subject to any disclaimer, the term of this patent is extended or adjusted under 35 U.S.C. 154(b) by 323 days.

(21) Appl. No.: 18/231,386

(22) Filed: Aug. 8, 2023

(65) Prior Publication Data

US 2025/0050818 A1 Feb. 13, 2025

(51) Int. Cl.
| | |
|---|---|
| B60R 11/02 | (2006.01) |
| B60R 11/00 | (2006.01) |
| F16B 47/00 | (2006.01) |
| H04M 1/04 | (2006.01) |

(52) U.S. Cl.
CPC ........ B60R 11/0241 (2013.01); F16B 47/006 (2013.01); H04M 1/04 (2013.01); *B60R 2011/0056* (2013.01)

(58) Field of Classification Search
CPC .................... B60R 2011/0056; B60R 11/0241
See application file for complete search history.

(56) References Cited

U.S. PATENT DOCUMENTS

| | | | |
|---|---|---|---|
| 6,749,160 B1 | 6/2004 | Richter | |
| 6,913,232 B2 | 7/2005 | Richter | |
| 7,178,771 B2 | 2/2007 | Richter | |
| 7,219,867 B2 | 5/2007 | Kalis et al. | |
| 7,241,069 B2 | 7/2007 | Richter | |
| 7,293,750 B2 | 11/2007 | Richter | |
| 7,296,771 B2 | 11/2007 | Kalis et al. | |
| 7,344,114 B2 | 3/2008 | Richter | |
| 7,431,250 B2 | 10/2008 | Chen | |
| 7,475,858 B2 | 1/2009 | Kalis et al. | |
| D587,188 S | 2/2009 | Mo | |
| 7,516,928 B2 | 4/2009 | Kalis et al. | |
| D613,731 S | 4/2010 | Yeo | |
| D638,008 S | 5/2011 | Richter | |
| 7,967,262 B2 * | 6/2011 | O'Brien | B60R 11/02 248/205.5 |
| D655,282 S | 3/2012 | Richter | |
| 8,191,839 B2 * | 6/2012 | Fan | F16B 47/006 248/205.5 |
| 8,356,781 B2 * | 1/2013 | Chen | F16B 47/006 248/205.8 |
| 9,145,913 B2 * | 9/2015 | Song | F16B 47/00 |
| 9,195,064 B1 | 11/2015 | Dovalis et al. | |
| 9,229,494 B2 | 1/2016 | Rayner | |
| 9,573,531 B2 | 2/2017 | Zhang | |
| 9,821,724 B2 | 11/2017 | Zhang et al. | |

(Continued)

FOREIGN PATENT DOCUMENTS

| | | |
|---|---|---|
| CN | 203809437 U | 9/2014 |
| CN | 205001297 U | 1/2016 |
| WO | WO 2021/097239 | 5/2021 |

*Primary Examiner* — Patrick F Marinelli
(74) *Attorney, Agent, or Firm* — Barnes & Thornburg LLP (57) ABSTRACT

A suction mount for mounting to a surface an accessory for a handheld electronic including a suction mount housing having an interface securable to the accessory for the handheld electronic device. A suction cup is disposed within a bore of the housing for engaging the surface by vacuum engagement.

18 Claims, 7 Drawing Sheets

(56) References Cited

U.S. PATENT DOCUMENTS

| | | | |
|---|---|---|---|
| 10,641,314 B1 * | 5/2020 | Fan | F16B 47/006 |
| 10,920,925 B2 | 2/2021 | Koch | |
| 11,712,115 B2 * | 8/2023 | Cheney | F16M 11/041 |
| | | | 248/70 |
| D1,009,848 S * | 1/2024 | Cheney | D14/253 |
| D1,012,088 S * | 1/2024 | Cheney | D14/447 |
| D1,044,757 S * | 10/2024 | Ba | D14/155 |
| 12,128,828 B2 * | 10/2024 | Kipper | F16M 13/022 |
| 12,330,565 B2 * | 6/2025 | Li | B60R 11/00 |
| 2007/0278371 A1 * | 12/2007 | Wang | F16M 11/10 |
| | | | 248/309.3 |
| 2008/0023606 A1 * | 1/2008 | Kalis | B60R 11/0258 |
| | | | 248/288.31 |
| 2008/0302946 A1 * | 12/2008 | Bury | B60R 11/0258 |
| | | | 248/560 |
| 2009/0090821 A1 * | 4/2009 | Kim | B60R 11/0258 |
| | | | 248/124.2 |
| 2009/0168308 A1 * | 7/2009 | O'Brien | B60R 11/02 |
| | | | 361/679.01 |
| 2010/0320341 A1 * | 12/2010 | Baumann | F16B 47/006 |
| | | | 248/299.1 |
| 2011/0255226 A1 * | 10/2011 | Duncan Seil | B60R 11/02 |
| | | | 361/679.01 |
| 2014/0191096 A1 | 7/2014 | Wiercinski et al. | |
| 2017/0214260 A1 * | 7/2017 | Kim | B60R 11/02 |
| 2022/0080811 A1 | 3/2022 | Shaw | |
| 2022/0378205 A1 * | 12/2022 | Cheney | F16M 11/041 |
| 2022/0412394 A1 | 12/2022 | Heo et al. | |
| 2023/0271563 A1 * | 8/2023 | Kipper | B60R 11/02 |
| | | | 248/205.5 |
| 2023/0356668 A1 * | 11/2023 | Li | B60R 11/00 |
| 2025/0050818 A1 * | 2/2025 | Choo | F16B 47/006 |

* cited by examiner

SUCTION MOUNT FOR A HANDHELD ELECTRONIC DEVICE ACCESSORY

BACKGROUND

The present disclosure relates to a suction mount for a handheld electronic device accessory.

SUMMARY

The present disclosure is directed to a suction mount for mounting to a surface an accessory for a handheld electronic device. The mount comprises a suction mount housing having a top and a bottom, the bottom defining a bore, the housing further having a flange disposed at the bottom and a ledge disposed between the top and the bottom, the flange having a lateral perimeter. The suction mount housing further includes an interface securable to the accessory for the handheld electronic device; a suction cup disposed within the bore for engaging the surface; and a lever pivotally mounted to the suction mount housing and coupled to the suction cup. The lever is pivotable between a first position wherein the suction cup is in a relaxed state and a second position to cause vacuum engagement of the suction cup and the surface when the suction cup is engaged with the surface. When the lever is in the second position, the lever is parallel to the surface, is disposed on the ledge and has a lateral perimeter that extends less than the lateral perimeter of the bottom flange.

The suction mount may include a pin coupling the lever to the housing. The housing may define a pair of elongate slots, the pin extending through the slots and having two ends, each end secured to the lever, the pin travelling along the slots during pivoting of the lever. The lever may be generally arcuate and extends around a portion of the housing when the lever is in the second position. The suction mount may also include a connector secured to the suction cup and a spring engaged with the connector and the housing, the spring biasing the connector and housing in opposite directions. The connector may include two posts, each post defining a hole, the pin extending through the holes within the bore. The connector may be secured to the suction cup, the suction mount may include a spring and the housing may include at least one protrusion extending towards the suction cup, the spring engaged with the connector and the protrusion and biasing the connector and housing in opposite directions. The suction cup and the connector may be a single integral structure.

The connector may include a hole that receives the pin. The protrusion may include a tongue and a pair of engaging arms and the coil may be a spring coil that defines a hole receiving the tongue, the engaging arms engaging the spring. The connector may include a pair of posts extending toward the top of the housing, each post defines a hole that receives the hinge pin. The suction mount may define a bore that receivingly engages the connector.

In a disclosed embodiment, none of the lateral perimeter of the lever extends to any of the lateral perimeter of the flange when the lever is in the second position. The lateral perimeter of the lever extends less than the lateral perimeter of the flange at all locations around the lateral perimeter of the lever when the lever is in the second position. The suction mount may also include a fastener for securing the interface to the accessory to the handheld device.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures, and like reference characters designate the same or similar parts throughout the figures, of which.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

Figure 1:
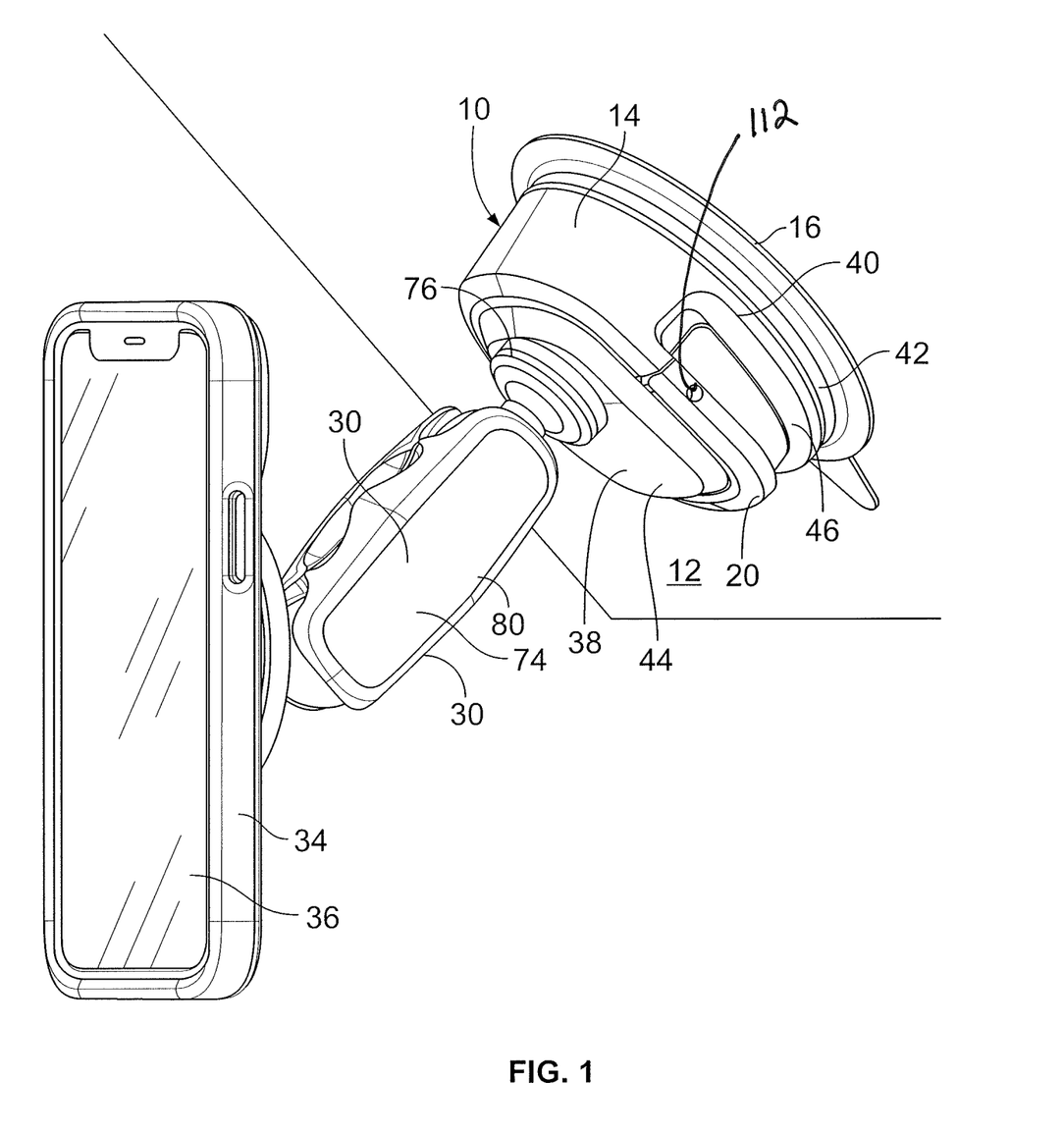
FIG. 1 is a perspective view of a suction mount mounting to a surface an accessory to an electronic handheld device in accordance with an illustrated embodiment of the present disclosure illustrating the accessory and the electronic handheld device secured to the suction mount.
Figure 2:
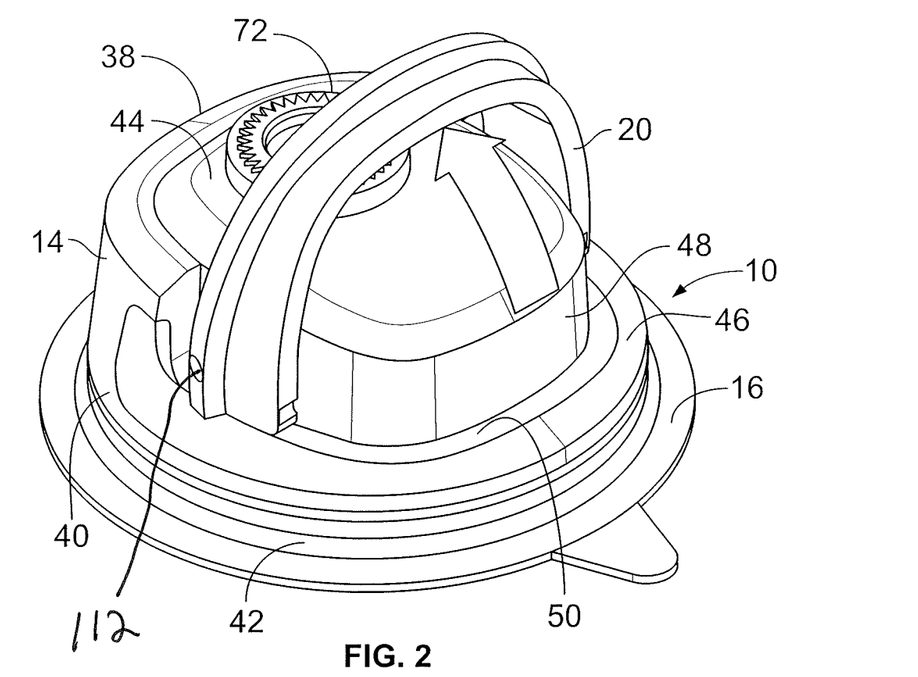
FIG. 2 is a top perspective view of the suction mount of FIG. 1, illustrating the lever of the suction mount in a first position.
Figure 3:
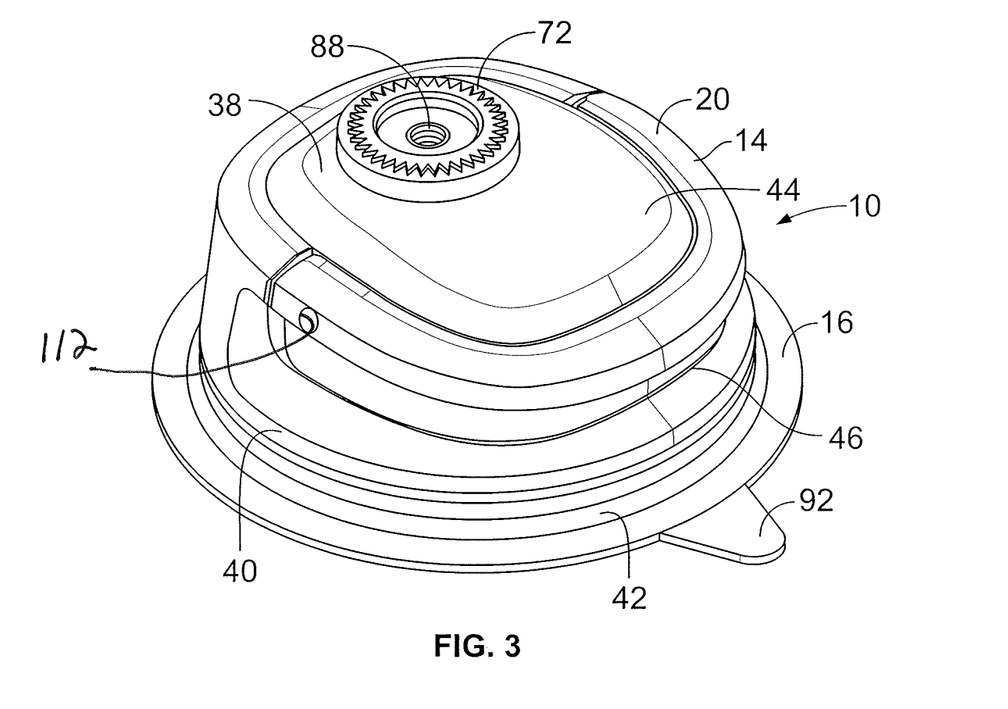
FIG. 3 is a top perspective view of the suction mount of FIG. 1, illustrating the lever of the suction mount in a second position.
Figure 4:
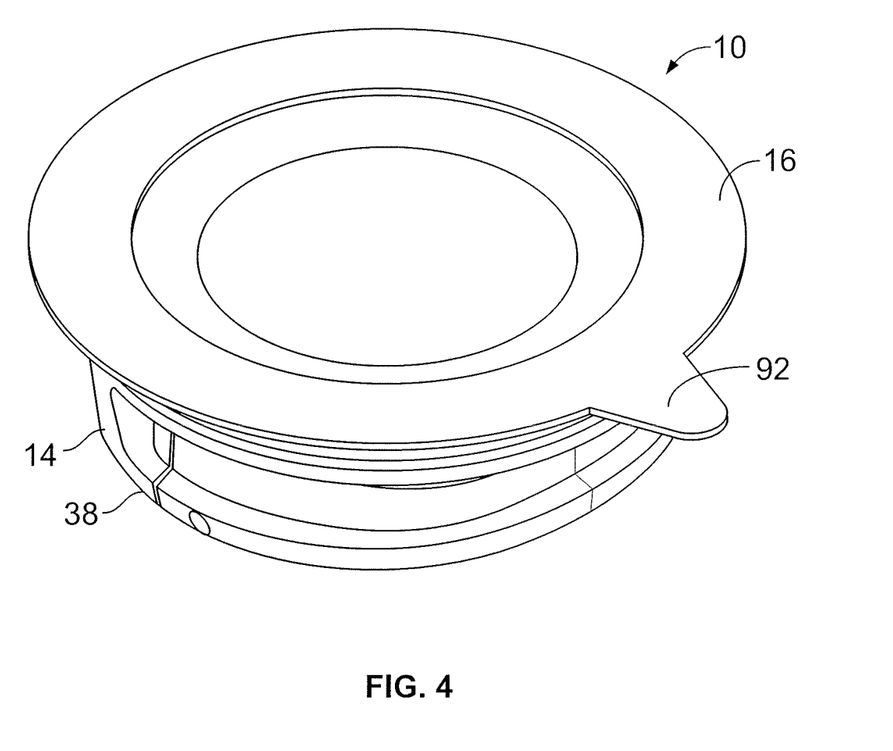
FIG. 4 is bottom perspective view of the suction mount of FIG. 1.
Figure 5:
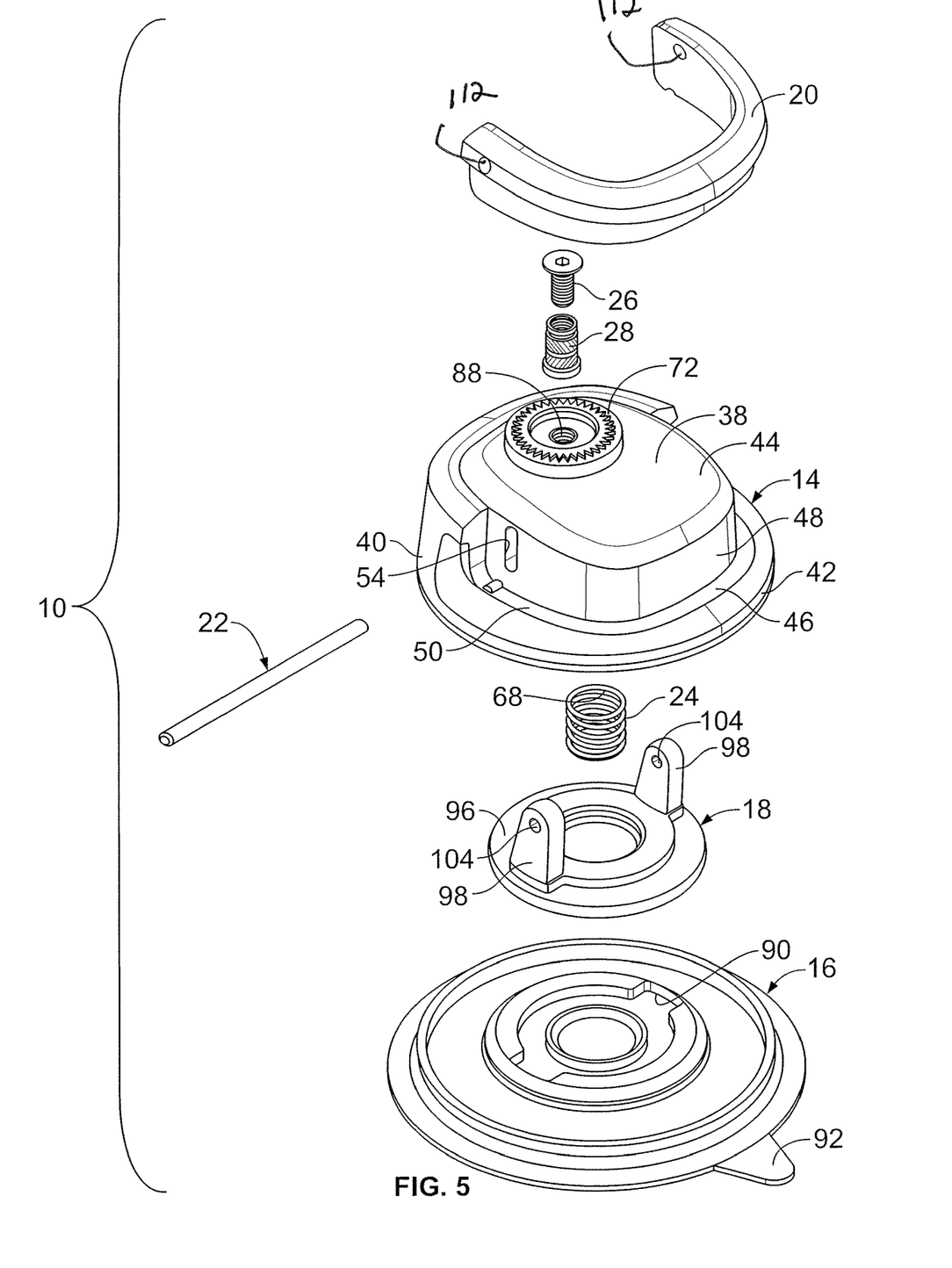
FIG. 5 is an exploded view of the suction mount of FIG. 1.
Figure 6:
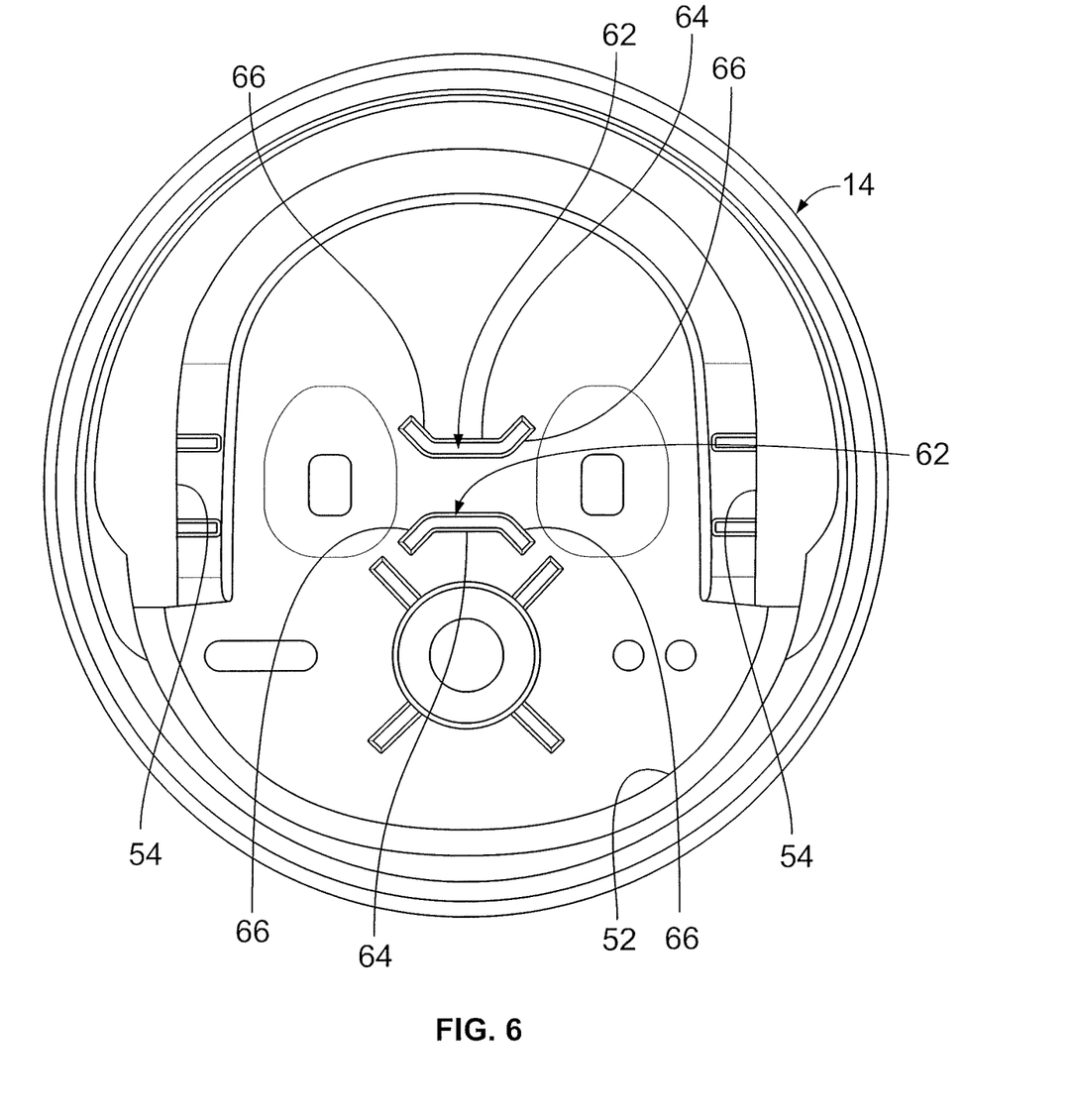
FIG. 6 is a bottom plan view of a suction mount housing in accordance with another illustrated embodiment of the present disclosure.

Embodiments of a suction mount 10 for mounting a case or other accessory for a smartphone or other handheld device to a surface 12 that allows an airtight seal, such as a windshield, a desk or any other such surface, is shown in FIGS. 1-8. The illustrated mount 10 includes a suction mount housing 14, a suction cup 16, a suction cup connector 18, an arcuate lever 20, a hinge pin 22, a coil spring 24, a fastener 26 and an insert 28. In FIG. 1, the suction mount 10 is illustrated secured to an accessory 30 which is secured to a case 34 of a handheld electronic device 36. The lever 20 is pivotable in a first direction relative to the housing 14 to release the suction cup 16 from the surface 12 (see e.g., FIG. 2), and in a second direction relative to the housing 14 to secure the suction cup 16 to the surface 12 by vacuum engagement (see, e.g., FIG. 3). The suction mount 10 may have more or less components in accordance with other embodiments of the present disclosure.

The illustrated housing 14 has a top 38, a bottom 40 and a flange 42 disposed at the bottom. The flange 42 has a lateral perimeter that extends parallel to the surface 12 when the suction mount 10 is engaged to the surface. The housing 14 includes a raised portion 44 and an arcuate ledge 46 for engaging the lever 20 when the lever is pivoted to the second position to secure the suction cup 16 to the surface 12. The ledge 46 is disposed between the top 38 and bottom 40 and extends generally parallel to the surface 12 when the mount 10 is secured to the surface 12. The ledge 46 has a lateral perimeter that does not extend as far as the lateral perimeter of the flange 42 when the lever 20 is in the second position. None of the lateral perimeter of the lever 20 extends to any of the lateral perimeter of the flange 42 when the lever 20 is in the second position. In other words, the lateral perimeter of the lever 20 extends less than the lateral perimeter of the flange 42 at all locations around the perimeter of the lever 20 when the lever 20 is in the second position. The raised portion 44 has an arcuate front face 48. The raised portion 44 and the ledge 46 define a cut-out portion 50 receiving the lever 20 when the lever is in the second position. The lever 20 pivots around the front face 48 when the lever is pivoted to the second position.

The bottom 40 of the illustrated housing 14 defines a bore 52 receiving the suction cup 16. The housing 14 also defines a pair of elongate slots 54 contiguous with the bore 52 and the cut-out portion 50. The slots 54 receive the pin 22 which extends through the bore 52. The slots 54 permit travel of the pin 22 along the slots when the lever 20 is pivoted between the first and second positions. The slots 54 permit travel of the pin 22 away from the top 38 when the lever 20 is rotated to the first position and towards the top 38 when the lever 20 is rotated to the second position. The housing 14 also includes a pair of protrusions 62 extending from beneath the top 38. Each protrusion 62 includes a tongue member 64 and a pair of engaging arms 66 extending away from the tongue member at an angle. The tongue member 64 is longer in length than the engaging arms 66. The tongue member 64 is received by the center hole 68 of the spring 24 and the bottoms of the engaging arms 66 are in contact with the spring. The spring 24 applies a biasing force in opposite directions on the protrusions 62 of the housing 14 and the suction cup connector 18.

The illustrated housing 14 also includes an interface 72 for engaging an accessory 74 having a mating interface 76 for engaging the interface 72 of housing 14. The accessory 30 may have any suitable form and, may, for example, be any suitable accessory currently on the market or hereinafter developed. In FIG. 1, for example, the accessory 68 is in the form of dual pivot arm 80 that secures to the case 34 of the handheld electronic device 36. The accessory 30 may instead be a case of the handheld electronic device 36. It may also be any type of arm or mount securable to a case of an handheld device 36 or to any other accessory for a handheld electronic device. Depending on the type of accessory 30, the fastener 26 can be used to secure the accessory 30 to the housing 14. The illustrated interface defines a hole 88 that receives the insert 28. The fastener 26 may be receivable by the insert 28 to secure certain types of accessories to the mount 10. The interface 72 may have any suitable configuration such as the illustrated configuration which is known in the art.

The suction cup 16 defines a bore 90 for receivingly engaging connector 18. In accordance with other embodiments, the suction cup 16 and connector 18 may be a single integral structure formed by co-molding of these two components. The illustrated suction cup 16 includes a tab 92 to help facilitate release of the suction cup 16 from the surface 12. The suction cup 16 may be any suitable suction cup such as any suitable suction cup known in the art. Similarly, the operation of the suction cup 16 for vacuum gripping the surface 12 and for releasing the suction cup from the surface may be consistent with suction cup operations known in the art.

The connector 18 comprises a base 96 received by the bore 90 and a pair of posts 98 extending from the base. Each post 98 defines a hole 104 for receiving the hinge pin 22. The connector 18 may be constructed of nylon or any other suitable materials in accordance with other embodiments of the present disclosure.

The illustrated lever 20 is arcuate may be U-shaped or semi-circular or have any other suitable arcuate or non-arcuate configuration. The lever 20 defines a pair of apertures 112 for receiving the hinge pin 22. The lever 20 has an arcuate overhang 120 that includes a bottom surface 122 for engaging the ledge 46 of the housing 14. The lever 20 has a lateral perimeter that is less than the lateral perimeter of the flange 42 when the suction cup 16 is in the second position. In the illustrated embodiment, the lateral perimeter of the lever 20 is substantially the same as the perimeter of the lateral overhang 120.

Figure 7:
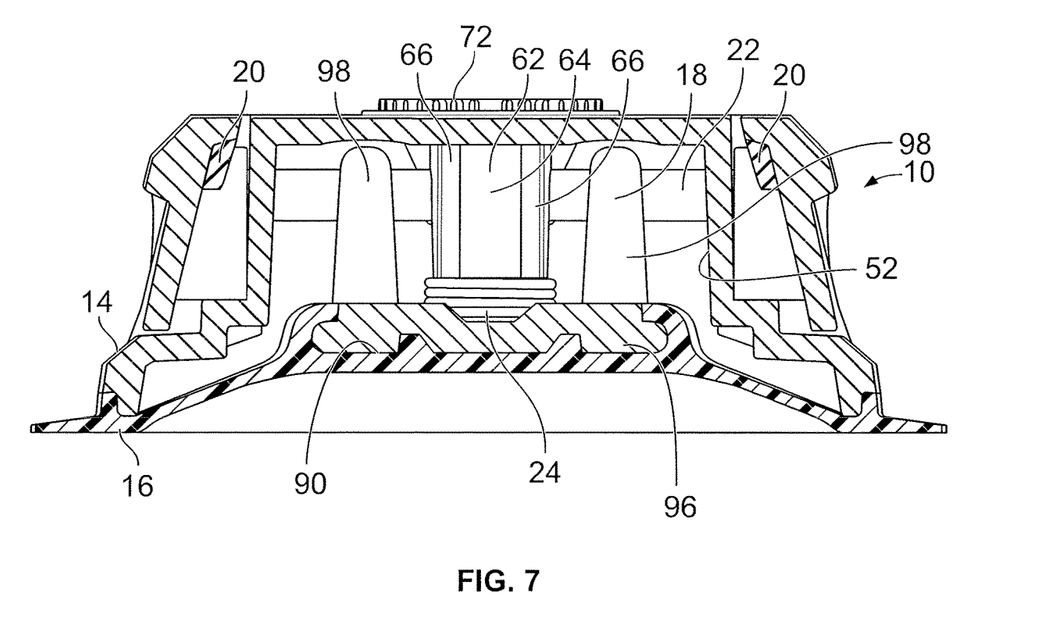
FIG. 7 is a sectional view of a suction mount in accordance with another illustrated embodiment of the present disclosure.
Figure 8:
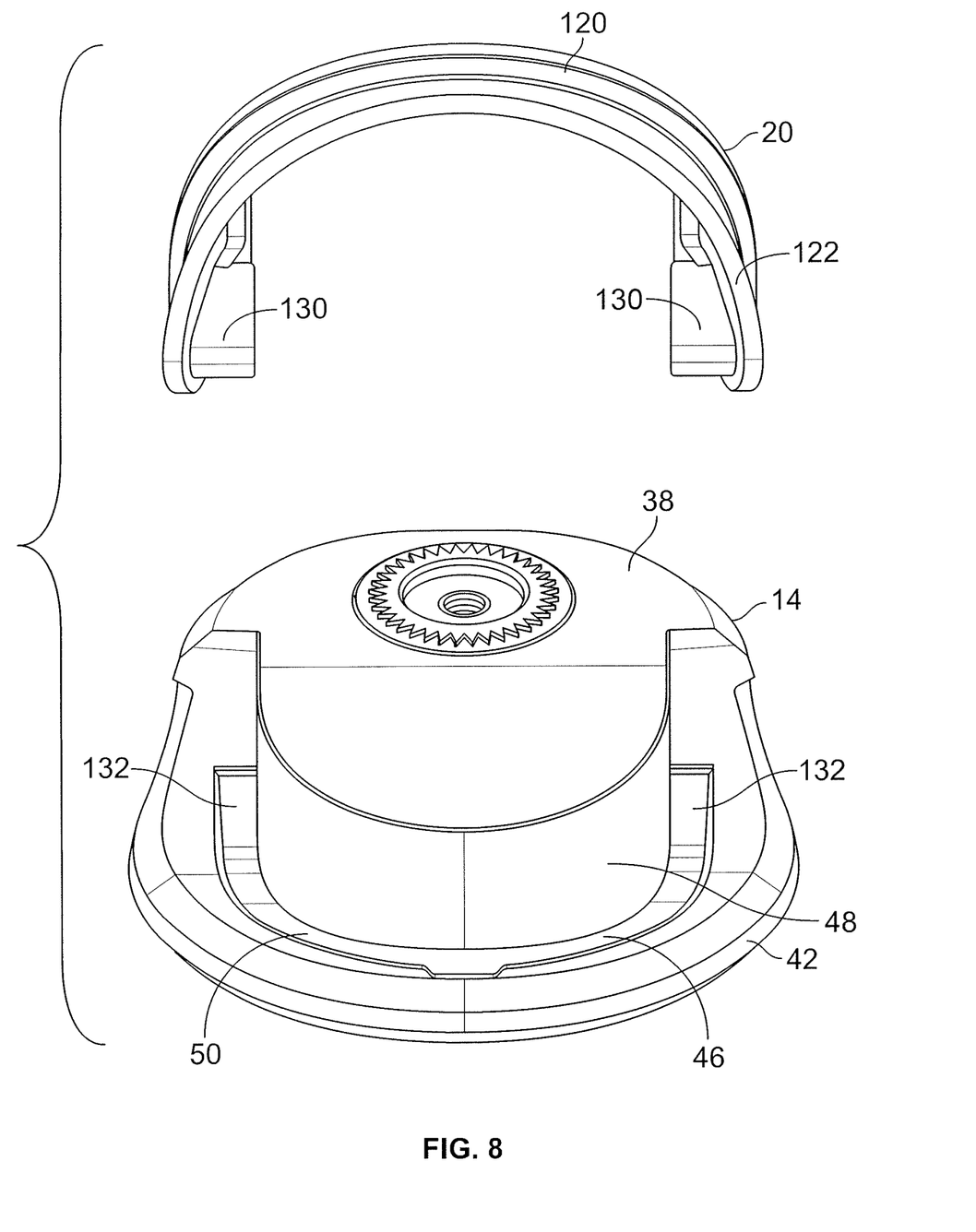
FIG. 8 is a perspective exploded view of the suction mount housing and lever of FIG. 7.

The suction mount 10 in accordance with the illustrated embodiment of the present disclosure operates as follows. The mount 10 is placed on the surface 12 with the lever 20 in the first position where it extends generally perpendicular to the surface. The suction cup 16 is in a relaxed state when the lever 20 is in the first position (see, e.g., FIG. 2). The lever 20 is pivoted to the second position to cause vacuum engagement of the suction cup 16 and the surface 12 (see, e.g. FIG. 3). In the embodiment of FIGS. 7 and 8, the lever 20 includes cam lobes 130 and cam guiding surfaces 132 and, as the lever 20 is pivoted to the second position, its cam lobes 130 act against the cam guiding surfaces 132 of the housing 14. Consequently the hinge pin 22 travels upwards within the slots 54, simultaneously engaging the suction cup 16 via the connector 18. This causes a portion of the suction cup to be drawn further up within the bore 52 of the housing 14, thus creating a vacuum. This engagement also causes compression of spring 24 between the connector 18 and protrusions 62. In the second position, the lever 20 is generally parallel to the surface 12. In the second position, the lever 20 is disposed on the ledge 46 and has a lateral perimeter that extends less than the lateral perimeter of the flange 42 of the housing 14 (see, e.g., FIG. 3). To disengage the mount 10 from the surface 12, the lever 20 is pivoted back to the first position (see, e.g., FIG. 2). As the lever 20 is pivoted to the first position, the spring 24 exerts a biasing force on the protrusions 62, assisting travel of the hinge pin 22 within the slots 54, and returning suction cup 16 back to its relaxed state and disengaging the mount 10 from the surface 12.

The illustrated embodiment of the suction mount of the present disclosure provides several advantages. The lever 20 pivots around the periphery of the front face 50 of the raised portion 44 of the housing 14. The lever 20 does not extend outside the lateral perimeter of the housing and extends less than the lateral perimeter of the housing 14. The lever 20 does not increase the lateral perimeter of the suction mount 10. This construction prevents or reduces the chances of unintentionally unlocking the lever 20. This construction also provides users with a tactile, easy-to-use method for attaching the suction cup 16 to the surface 12, and also facilitates later ease of removal from the surface. The lever 20 also provides users with a visual indication of its first position where the lever is unlocked and the suction cup 16 is relaxed, and the second position where the lever is locked and the suction cup 16 is engaged to the surface 12. The shape of the lever 20 allows a full 90 degrees of articulation within its compact form factor, while maintaining adequate clearances when combined with the accessory 30.

Some non-limiting examples of the above-described embodiments can include the following:

1. A suction mount for mounting to a surface an accessory for a handheld electronic device, the mount comprising:
    a suction mount housing having a top and a bottom, the bottom defining a bore, the housing further having a flange disposed at the bottom and a ledge disposed between the top and the bottom, the flange having a lateral perimeter, the suction mount housing further includes an interface securable to the accessory for the handheld electronic device;
    a suction cup disposed within the bore for engaging the surface; and
    a lever pivotally mounted to the suction mount housing and coupled to the suction cup, the lever pivotable between a first position wherein the suction cup is in a relaxed state and a second position to cause vacuum engagement of the suction cup and the surface when the suction cup is engaged with the surface;
    wherein, when the lever is in the second position, the lever is parallel to the surface, is disposed on the ledge and has a lateral perimeter that extends less than the lateral perimeter of the bottom flange.
2. The suction mount of 1 further including a pin coupling the lever to the housing.
3. The suction mount of 2 where the housing defines a pair of elongate slots, the pin extending through the slots and having two ends, each end secured to the lever, the pin travelling along the slots during pivoting of the lever.
4. The suction mount of 3 wherein the lever is generally arcuate and extends around a portion of the housing when the lever is in the second position.
5. The suction mount of 2 further including a connector secured to the suction cup and a spring engaged with the connector and the housing, the spring biasing the connector and housing in opposite directions.
6. The suction mount of 5 wherein the connector includes two posts, each post defining a hole, the pin extending through the holes within the bore.
7. The suction mount of 2 further including a connector secured to the suction cup and a spring and the housing includes at least one protrusion extending towards the suction cup, the spring engaged with the connector and the protrusion and biasing the connector and housing in opposite directions.
8. The suction mount of 7 wherein the connector includes a hole that receives the pin.
9. The suction mount of 7 wherein there are two protrusions.
10. The suction mount of 7 wherein the protrusion includes a tongue and a pair of engaging arms and the coil is a spring coil that defines a hole receiving the tongue, the engaging arms engaging the spring.
11. The suction mount of 10 wherein there are two protrusions.
12. The suction mount of 11 wherein the connector includes a pair of posts extending toward the top of the housing, each post defines a hole that receives the hinge pin.
13. The suction mount of 12 wherein the suction cup defines a bore that receivingly engages the connector.
14. The suction mount of 12 wherein the suction cup and the connector are a single integral structure.
15. The suction mount of 1 wherein none of the lateral perimeter of the lever extends to any of the lateral perimeter of the flange when the lever is in the second position.
16. The suction mount of 1 the lateral perimeter of the lever extends less than the lateral perimeter of the flange at all locations around the lateral perimeter of the lever when the lever is in the second position.
17. The suction mount of 1 wherein the lever is generally arcuate and extends around a portion of the housing when the lever is in the second position.
18. The suction mount of 1 further comprising a fastener for securing the interface to the accessory to the handheld device.
19. The suction mount of 1 wherein the degree of rotation of the lever between the first and second positions is 90 degrees.
20. The suction mount of 1 wherein the lever is generally perpendicular to the surface when the housing is disposed on the surface and when the lever is in the first position.

As used in the foregoing description, the terms "top", "bottom", "upward" and "downward" simply refer to an orientation of the illustrated structure and are not intended to be limiting to the scope of the disclosure.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The invention claimed is:

1. A suction mount for mounting to a surface an accessory for a handheld electronic device, the mount comprising:
    a suction mount housing having a top and a bottom, the bottom defining a bore, the housing further having a flange disposed at the bottom and a ledge disposed between the top and the bottom, the flange having a lateral perimeter, the suction mount housing further includes an interface securable to the accessory for the handheld electronic device;
    a suction cup disposed within the bore for engaging the surface; and
    a generally arcuate lever pivotally mounted to the suction mount housing and coupled to the suction cup, the lever pivotable between a first position wherein the suction cup is in a relaxed state and a second position to cause vacuum engagement of the suction cup and the surface when the suction cup is engaged with the surface;
    wherein, when the lever is in the second position, the lever extends parallel to the ledge to surround a portion of the housing, is disposed on the ledge, has a lateral perimeter that extends less than the lateral perimeter of the bottom flange.
2. The suction mount of claim 1 further including a pin coupling the lever to the housing.
3. The suction mount of claim 2 where the housing defines a pair of elongate slots, the pin extending through the slots and having two ends, each end secured to the lever, the pin travelling along the slots during pivoting of the lever.

4. The suction mount of claim 2 further including a connector secured to the suction cup and a spring engaged with the connector and the housing, the spring biasing the connector and housing in opposite directions.

5. The suction mount of claim 4 wherein the connector includes two posts, each post defining a hole, the pin extending through the holes within the bore.

6. The suction mount of claim 2 further including a connector secured to the suction cup and a spring and the housing includes at least one protrusion extending towards the suction cup, the spring engaged with the connector and the protrusion and biasing the connector and housing in opposite directions.

7. The suction mount of claim 6 wherein the connector includes a hole that receives the pin.

8. The suction mount of claim 6 wherein there are two protrusions.

9. The suction mount of claim 6 wherein the protrusion includes a tongue and a pair of engaging arms and the coil is a spring coil that defines a hole receiving the tongue, the engaging arms engaging the spring.

10. The suction mount of claim 9 wherein there are two protrusions.

11. The suction mount of claim 10 wherein the connector includes a pair of posts extending toward the top of the housing, each post defines a hole that receives the hinge pin.

12. The suction mount of claim 11 wherein the suction cup defines a bore that receivingly engages the connector.

13. The suction mount of claim 11 wherein the suction cup and the connector are a single integral structure.

14. The suction mount of claim 1 wherein none of the lateral perimeter of the lever extends to any of the lateral perimeter of the flange when the lever is in the second position.

15. The suction mount of claim 1 the lateral perimeter of the lever extends less than the lateral perimeter of the flange at all locations around the lateral perimeter of the lever when the lever is in the second position.

16. The suction mount of claim 1 further comprising a fastener for securing the interface to the accessory to the handheld device.

17. The suction mount of claim 1 wherein the degree of rotation of the lever between the first and second positions is 90 degrees.

18. The suction mount of claim 1 wherein the lever is generally perpendicular to the surface when the housing is disposed on the surface and when the lever is in the first position.

* * * * *